United States Patent [19]

Doi et al.

[11] 3,745,649

[45] July 17, 1973

[54] METHOD OF MANUFACTURING ELECTRIC SURFACE HEATERS

[75] Inventors: Kazuo Doi; Ryuzo Kato; Tadashi Matsumoto; Fujio Niizuma; Shigenori Kugumiya; Yasuo Tanaka; Motoharau Kitamura, all of Osaka, Japan

[73] Assignee: Matsushita Denko Kabushiki Kaisha, Osaka, Japan

[22] Filed: Apr. 14, 1971

[21] Appl. No.: 133,951

Related U.S. Application Data

[63] Continuation-in-part of Ser. No. 802,071, Feb. 25, 1969, Pat. No. 3,584,198.

[30] Foreign Application Priority Data

| | | |
|---|---|---|
| Feb. 29, 1968 | Japan | 43/16031 |
| Mar. 12, 1968 | Japan | 43/19314 |
| Apr. 18, 1968 | Japan | 43/31529 |
| May 31, 1968 | Japan | 43/45504 |
| May 31, 1968 | Japan | 43/45516 |
| June 18, 1968 | Japan | 43/51520 |
| Apr. 18, 1968 | Japan | 43/25976 |
| Aug. 15, 1968 | Japan | 43/58172 |

[52] U.S. Cl. .......................... 29/611, 156/3, 156/18, 156/244

[51] Int. Cl. .............................................. H05b 3/00

[58] Field of Search ...................... 29/611, 621, 610; 156/3, 8, 18, 244, 221, 250, 269; 219/211–213, 343–345, 527–529, 549; 338/212

[56] References Cited

UNITED STATES PATENTS

| | | | |
|---|---|---|---|
| 2,849,298 | 8/1958 | Werberig | 156/3 |
| 3,234,066 | 2/1966 | Mulholland | 156/244 |
| 3,263,307 | 8/1966 | Lund et al. | 29/611 |
| 3,516,154 | 6/1970 | Cooper et al. | 29/611 |
| 3,536,545 | 10/1970 | Traynor et al. | 156/8 X |
| 3,562,037 | 2/1971 | Travis | 156/3 |
| 3,634,166 | 1/1972 | Frielingsdorf | 156/244 |

*Primary Examiner*—Richard J. Herbst
*Assistant Examiner*—V. A. DiPalma
*Attorney*—Wolfe, Hubbard, Leydig, Voit & Osann

[57] ABSTRACT

A method of manufacturing flexible electric surface heaters which involves laminating thermoplastic to a first side of a sheet of electrically conductive metal foil, etching the metal foil according to a repetitive pattern on the foil to form repetitive metal foil heater elements, and laminating thermoplastic to the second side of the etched metal foil.

18 Claims, 6 Drawing Figures

INVENTORS:
KAZUO OOI
RYUZO KATO
TADASHI MATSUMOTO
FUJIO NIIZUMA
SHIGENORI KUGUMIYA
YASUO TANAKA
MOTOHARAU KITAMURA
BY
Wolfe, Hubbard, Leydig, Voit & Osann, Ltd.
ATTORNEYS.

INVENTORS:
KAZUO DOI
RYUZO KATO
TADASHI MATSUMOTO
FUJIO NIIZUMA
SHIGENORI KUGUMIYA
YASUO TANAKA
MOTOHARAU KITAMURA

BY
Wolfe, Hubbard, Leydig, Voit & Osann,
ATTORNEYS.

INVENTORS.
KAZUO DOI
RYUZO KATO
TADASHI MATSUMOTO
FUJIO NIIZUMA
SHIGENORI KUGUMIYA
YASUO TANAKA
MOTOHARAU KITAMURA
BY
Wolfe, Hubbard, Leydig, Voit & Osann,
ATTORNEYS.

METHOD OF MANUFACTURING ELECTRIC SURFACE HEATERS

CROSS-REFERENCE TO RELATED APPLICATIONS

The present application is a continuation-in-part of the copending Doi et al. application Ser. No. 802,071, filed Feb. 25, 1969, and allowed on Nov. 20, 1970, for "Flexible Electric Surface Heaters", now U.S. Pat. No. 3,584,198.

This invention relates generally to a method for manufacturing electric surface heaters. More specifically, the invention relates to a method for manufacturing flexible electric surface heaters in a single line process, that is, in a single production line.

It is a primary object of this invention to provide a simple and efficient method of manufacturing flexible electric surface heaters.

Additionally, it is an important object of this invention to provide a simple and efficient method of continuously manufacturing in an automated single line process flexible electric surface heaters.

Another significant object of this invention is to provide a simple and efficient method of manufacturing highly uniform electric surface heaters.

A further object of this invention is to provide a simple and efficient method of manufacturing flexible electric surface heaters of varied designs. A related object of this invention is to provide a simple and efficient method of manufacturing flexible electric surface heaters which are thermosensitive.

Yet another significant object of this invention is to provide a method of manufacturing flexible electric surface heaters in which the electric heater element of each surface heater is permanently bonded to its insulating cover.

Other objects and advantages of the invention will become apparent from the following detailed description of the invention and the accompanying drawings in which.

Figure 1:
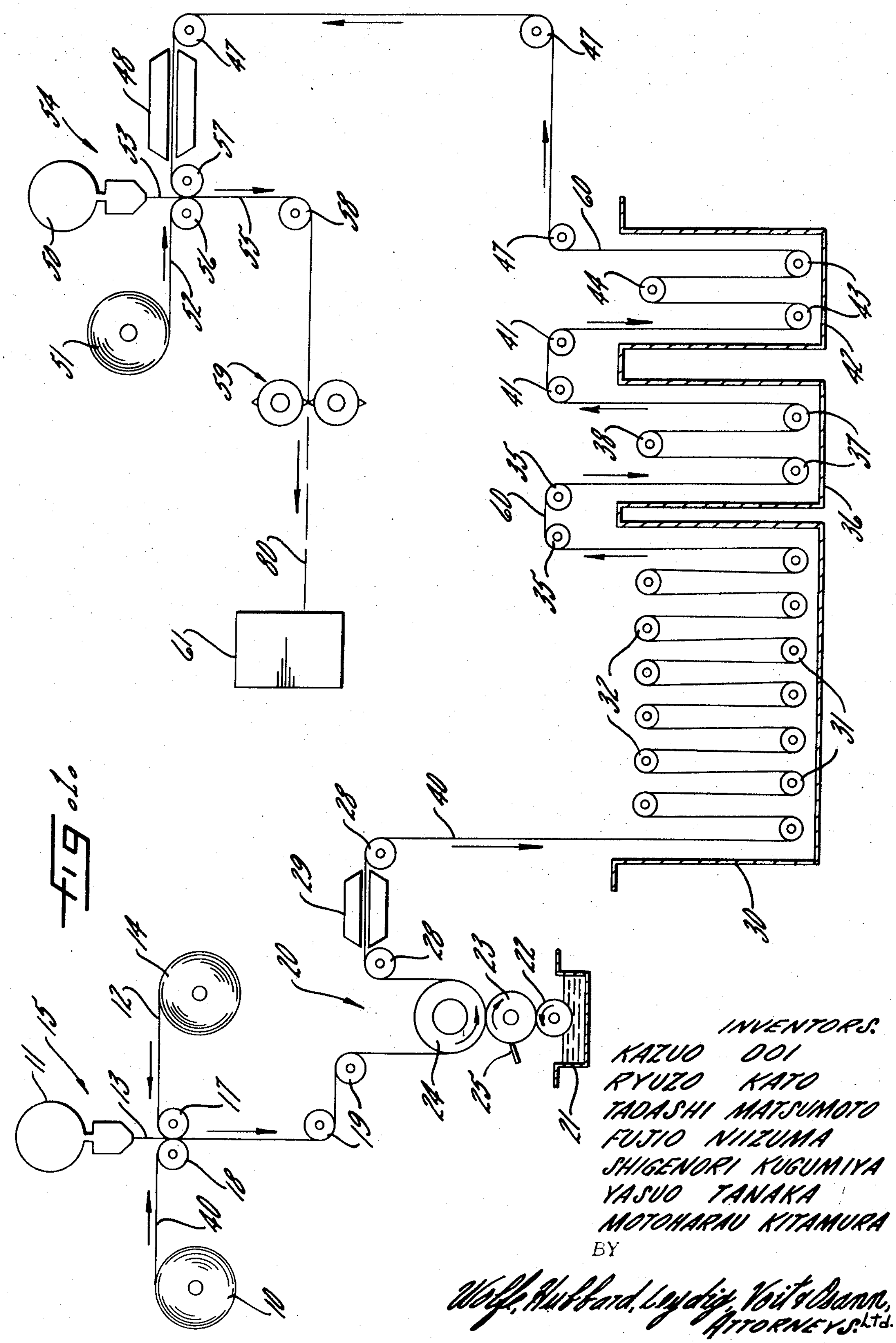
FIG. 1 is a schematic side elevation of one illustrative process embodying this invention.

Turning first to FIG. 1, a roll of metal foil 10 supplies a continuous metal foil sheet 40 which moves through the automated production apparatus at a constant line speed in the direction indicated by the arrows. This metal foil may be iron, copper, aluminum, zinc, a tin-lead alloy or other electrically conductive metal having a suitable thermal expansion coefficient, that is, a thermal expansion coefficient that is approximately equal to the thermal expansion coefficient of the thermoplastic film which will enclose the metal foil.

To the top or first surface of the foil 40 is continuously applied a thin layer of molten thermoplastic resin 13 which is supplied by a suitable extruder 11. Suitable thermoplastics are polyethylene, polyamide, polyvinyl formal, polyurethane series adhesives, nitrile rubber or the like.

On top of this molten thermoplastic resin 13 is applied a thin strip of flexible thermoplastic material or film 12 which is supplied at the constant line speed of the metal foil 40 from a roll 14, both layers of thermoplastic completely covering the top of the foil 40. The thermoplastic film 12 acts as an insulator to electrically isolate the conductive heater elements from the surface heater's environment Suitable thermpolastics for use as the insulating thermoplastic film 12 are polyimid, saturated polyester film, polytrifluoroethylene, and polycarbonate. Care must be taken to use only those thermoplastic films which have thermal expansion coefficients that are approximately equal to the thermal expansion coefficient of the metal foil used as the heater elements so as to avoid cracking and separation which can occur during operation of the heaters if the rates of thermal expansion of the metal foil and the thermoplastic film are not approximately equal. See Tables 1 and 2 below for a comparison of the thermal expansion coefficients of suitable insulating thermoplastic film and metal foils.

TABLE 1

| Thermoplastic Film | Thermal Expansion Coefficient | Temperature Use |
|---|---|---|
| Polyimid | $2.0 \times 10^{-5}$/°C | 400°C |
| Saturated Polyester Film | $2.7 \times 10^{-5}$/°C | 150°C |
| Polytrifluoroethylene | $4.5 \times 10^{-5}$/°C | 200°C |
| Polycarbonate | $7.0 \times 10^{-5}$/°C | 140°C |

TABLE 2

| Metal Foil | Thermal Expansion Coefficient |
|---|---|
| Iron | $1.17 \times 10^{-5}$/°C |
| Copper | $1.65 \times 10^{-5}$/°C |
| Tin (90%) – Lead (10%) | $2.2 \times 10^{-5}$°C |
| Aluminum | $2.4 \times 10^{-5}$/°C |
| Zinc | $3.9 \times 10^{-5}$/°C |

To cause the molten thermoplastic resin 13 to set properly and to permanently laminate the two layers of thermoplastic on the metal foil 40, the thermoplastic covered metal foil 40 is passed at a continuous line speed between pressure rollers which comprise a rubber press roller 17 and a cooling roller 18 which, as an example, may be a water-circulation type cooling roller. The molten thermoplastic cools and becomes a flexible bonding agent to permanently hold the insualting thermoplastic film 12 to the metal foil 40 at the operating temperatures of the heaters.

The steps of applying the molten thermoplastic resin 13 and laminating the insulating thermoplastic film 12 to the metal foil 40 are performed approximately simultaneously. Referring to FIG. 1, as the metal foil 40 is supplied from roll 10 toward the pressure rollers 17, 18, the extruder 11 applies a thin layer of molten thermoplastic 13 to a first surface of the metal foil, and the insulating thermoplastic film 12 is supplied from roll 14 to immediately overlap the molten resin. The resulting combination is fed through the pressure rollers 17, 18 during which time the molten resin 13 cools to form the permanent bond between the metal foil 40 and the insulating film 12.

From the pressure rollers 17, 18, the metal foil 40 with the laminated layers of thermoplastic 12, 13 is directed at a constant line speed by guide rollers 19 to an applicator or printer 20 which applies or prints a pattern of anti-corrosive material or ink on the bottom or second surface of the metal foil. The pattern of anti-corrosive material printed on the bottom surface of the metal foil inhibits the corrosion or eating away of that portion of the metal foil covered by the pattern during a subsequent etching process. As shown in FIG. 1, the applicator printer 20 comprises an ink reservoir 21 which holds a supply of anti-corrosive ink at a level such that a roller 22 extends below the top level of the anti-corrosive ink so as to pick up ink as it rotates through the ink supply and transfer this ink to a printing roller 23. Roller 23 has engraved on its surface the pattern which is to be printed on the bottom of metal foil 40; and, as they rotate, printing roller 23 accepts the anti-corrosive ink from roller 22 and prints the ink pattern on the metal foil 40 which is pressed against the printing roller 23 by a press roller 24. A doctor blade 25 removes excess ink from the printing roller 23.

The pattern printed on the metal foil can consist of merely a heater element of a desired design for a typical surface heater; reference can be had to FIG. 3 for such a surface heater, which will be discussed in detail below. Or the pattern can be varied to produce a thermosensitive surface heater which would include wth the heater element an electrode line of a design appropriate for the chosen heater element; reference can be had to FIGS. 4 and 5 for surface heaters which include electrode lines with the heater elements. If the pattern includes an electrode line, the molten thermoplastic resin 13 must be a thermosensitive resin, such as an ester copolymer 12 nylon.

It is not an essential element of the present invention that the thermoplastic resin 13 and the thermoplastic film 12 be laminated on the metal foil 40 before the pattern of anti-corrosive ink is printed on the metal foil. To the contrary, the invention includes the method wherein the anti-corrosive ink is applied or printed on a first surface of the metal foil before any thermoplastic resin and film are laminated on the metal foil.

Returning to FIG. 1, from the applicator 20 guide rollers 28 direct the metal foil with the desired pattern of anti-corrosive ink printed thereon through a dryer 29 and then on through an etching tank 30. Two sets of guide rollers 31 and 32 lead the foil at a constant line speed through the etching tank 30 which contains a caustic solution that etches away those parts of the foil not treated with the anti-corrosive ink to form a continuous sheet of repetitive metal foil heater elements 60. After exiting from the etching tank 30, the continuous sheet of repetitive metal foil heater elements 60 are directed by guide rollers 35 to a neutralizing tank 36 which contains a solution that neutralizes the caustic solution adhering to the metal foil and the laminated thermoplastic. The sheet 60 is led through the neutralizing tank 36 by two further sets of guide rollers 37 and 38. After emerging from the tank 36, the sheet 60 is directed to a washing tank 42 by guide rollers 41 and led therethrough by two additional sets of guide rollers 43 and 44. From the washing tank 42, the sheet 60 is inverted by guide rollers 47 and passed through a second dryer 48 which completely dries the metal foil and the laminated thermoplastic on the foil's first surface.

A second thin layer of molten thermoplastic resin 53, of the same type as molten thermoplastic resin 13, is applied to the second surface of the dried metal foil 60, which is moving at the constant line speed, by another suitable extruder 50. This molten thermoplastic completely fills the recesses in the etched metal foil without trapping air bubbles between the foil and the thermoplastic. On top of this molten thermoplastic resin 53 is applied, approximately simultaneously with the application of the molten thermoplastic resin 53 to the continuous sheet of repetitive metal foil heater elements 60, a second thin strip of insulating thermoplastic film 52, likewise of the same type as thermoplastic film 12, which is supplied at the constant line speed of the metal foil 60 from a roll 51; the two second layers of thermoplastic completely cover the second surface of metal foil 60. The foil is then passed between a rubber press roller 57 and a cooling roller 56, which, like roller 18, may be a water-circulation type cooling roller; cooling roller 56 and rubber press roller 57 cause the molten thermoplastic 53 to set properly and permanently laminate the two layers of thermoplastic on the metal foil.

The metal foil sheet 55, which has a complete outer cover of thermoplastic film, is directed by a guide roller 58 at a constant line speed to slicing rollers 59 which separate the continuous strip of foil and thermoplastic covering between each of the repetitive metal foil heater elements into a plurality of discrete surface heaters 80. The individual heaters 80 are then fed by any suitable fashion to station 61 where electric terminals are applied in any suitable manner to each heating element.

The use of a thermoplastic resin of the type described herein insures that the insulating thermoplastic film is not subjected to high temperatures, above approximately 260°C, which could cause the film to become brittle. The molten thermoplastic resin cools sufficiently during its fall from the extruders onto the sheet of metal foil that the thermoplastic film is not damaged by excessive temperatures; the immediate application of the cooling process after the thermoplastic film has been placed on top of the thermoplastic resin also protects the thermoplastic resin. In a further embodiment of manufacturing non-thermosensitive electric surface heaters the steps of laminating a thermoplastic film to both sides of the metal foil can be eliminated. The non-thermosensitive thermoplastic resins are good electrical insulators and provide the metal foil with sufficient protection for many uses of the surface heater against damagaing stresses from objects striking or pressing against the exterior ot the surface heater.

It should be noted that for this embodiment of the invention and other embodiments the cooling process need not be accomplished by a cooling roller; the cooling steps can be performed, for instance, by the use of a blower which blows a stream of cooling air onto the surface of the thermoplastic resin or by other means known to those skilled in the art.

However, the use of a thermoplastic film in the non-thermosensitive embodiments provides added protection for the metal foil because the thermoplastic film assures that the thermoplastic layers on both sides of the metal foil are of a more constant thickness so that stresses on the outside of the surface heater are evenly distributed.

Figures 3, 4, 5, 6:
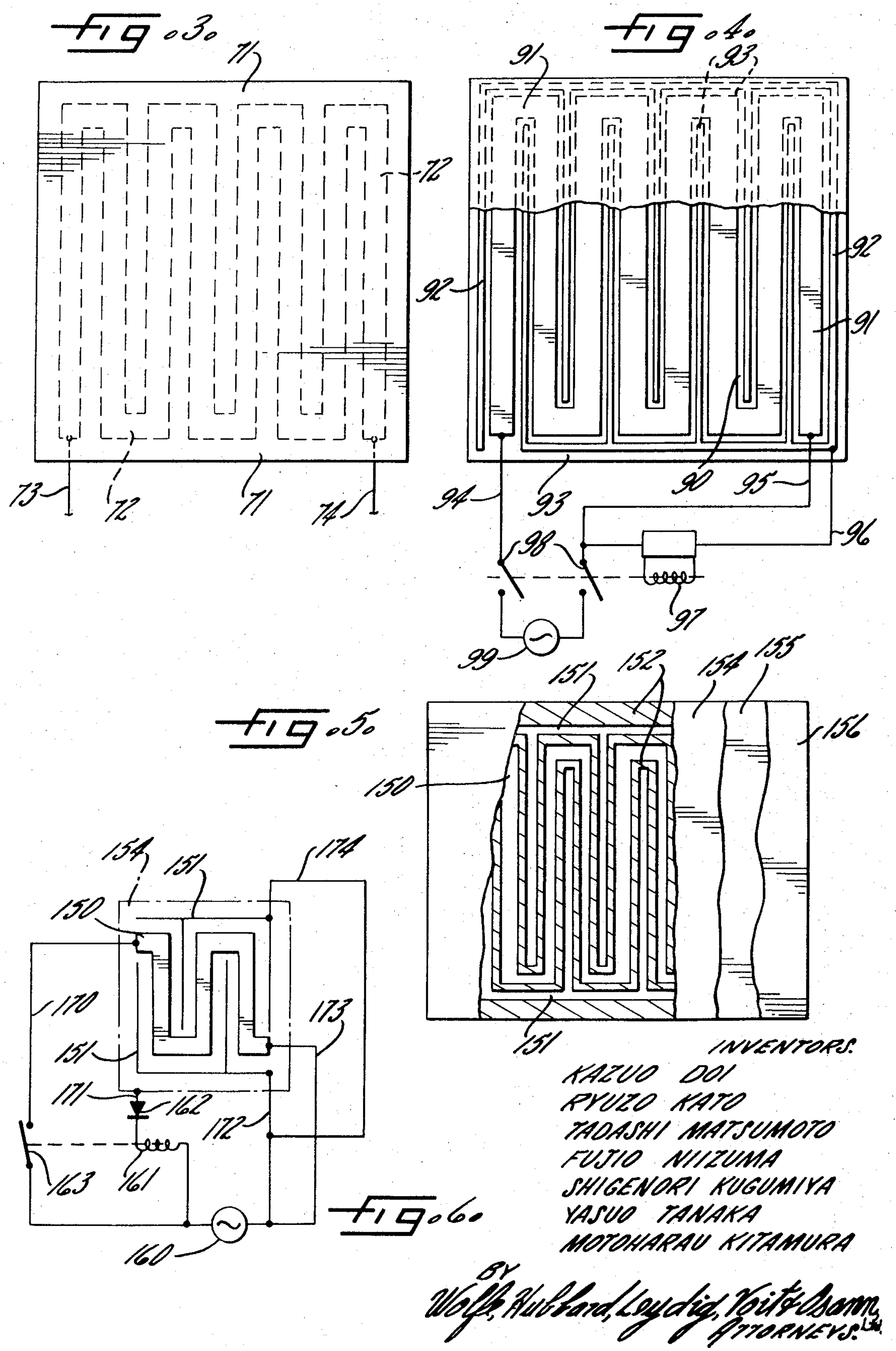
FIG. 3 is a plan view of an electric surface heater manufactured according to one embodiment of the present invention.
FIG. 4 is a plan view of another electric surface heater manufactured according to a second embodiment of the present invention, with a portion of the insulating film on the top surface of the heater removed.
FIG. 5 is a plan view of another electric surface heater manufactured according to a third embodiment of the present invention with portions removed.
FIG. 6 is a schematic plan view of the surface heater shown in FIG. 5 showing a possible wiring diagram.

As illustrated in the completed surface heater of FIG. 3, the pattern printed on the metal foil may consist of merely a series of unit heater elements of a zig-zag configuration. Electrically connected to a metal foil conductor or heater element 72 are two leads 73 and 74 which are then connected to a power source during the heater's operation. Completely surrounding the metal foil conductor 72 is a laminated thermoplastic 71 which consists of an inner layer of molten thermoplastic resin which has been cooled, as described herein, and an outer layer of an insulating thermoplastic film.

FIG. 4 illustrates a modified surface heater easily manufactured according to the disclosed invention; this is a thermosensitive surface heater, and it monitors the temperature at which it is operating and shuts itself off when this temperature exceeds a predetermined level. A metal foil conductor or heater element 91 has a zigzag pattern, and situated between each turn of the metal foil conductor 91 at a fixed space 90 from the conductor is a continuous metal foil electrode line 92. Both conductor 91 and electrode line 92 are formed from the same strip of metal foil 40; this result is effected by the pattern of a combination heater element and electrode line on the printing roller 23. Completely surrounding and separating the conductor 91 and the electrode line 92 is a laminated thermoplastic 93 consisting of an inner layer of molten thermoplastic resin which has been cooled and an outer layer of an insulating thermoplastic film. The inner cooled thermoplastic resin is a thermosensitive organic material which has a negative temperature-resistance coefficient such as, for example, polyamide or polyvinyl formal. In such a thermosensitive thermoplastic resin the electrical resistance to current flow of the resin decreases as its temperature increases.

Electrically connected to the terminal ends of the conductor 91 are leads 94 and 95 and to the electrode line 92 is a lead 96. During normal operation of the surface heater of FIG. 3 contacts 98 are closed, and a power source 99 is connected to the terminal ends of conductor 91 through the contacts 98 and the leads 94 and 95. However, as the temperature of the heater rises, the electrical resistivity of the cooled thermoplastic resin decreases such that a leakage current flows from the conductor 91 through the cooled thermoplastic resin to the electrode line 92. At a predetermined temperature a sufficient amount of leakage current flows to the electrode line 92 and through the lead 96 to activate safety device 97 which in turn opens contacts 98 to remove the power source 99 from the conductor 91. When the temperature decreases sufficiently, the leakage current drops below the level necessary to maintain safety device 97 in operation; at this point contacts 98 re-close and power is once again applied to conductor 91.

Figure 2:
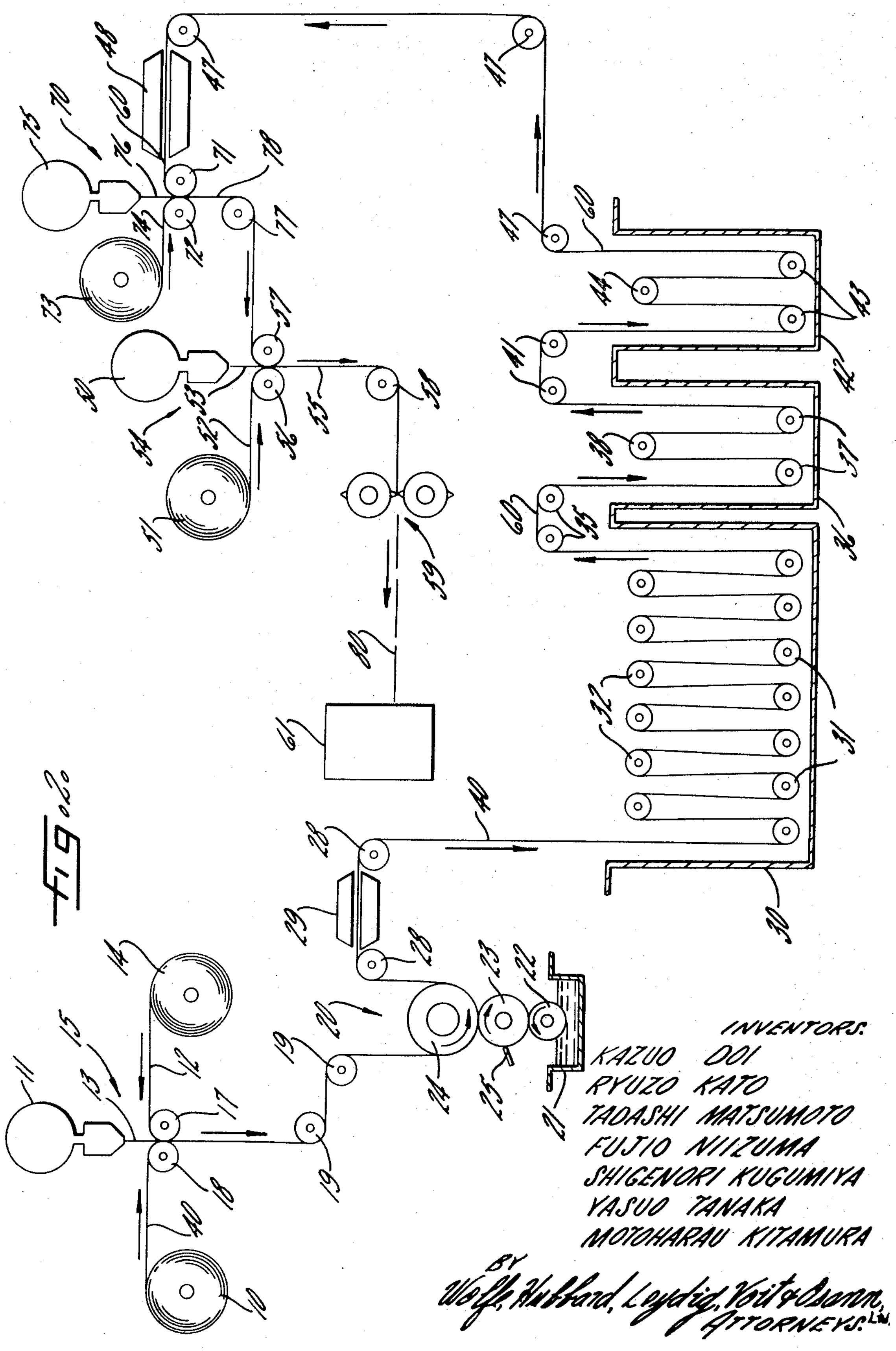
FIG. 2 is a schematic side elevation of a second illustrative process embodying this invention.

Turning now to FIG. 2, the initial steps of this embodiment of the invention are basically the same as the early steps of the other disclosed embodiments. Specifically, a first continuous sheet of metal foil 40, supplied at a constant line speed has laminated to one of its surfaces a layer of molten thermosensitive thermoplastic resin 13, such as an ester copolymer 12 nylon, and a continuous sheet of flexible insulating thermoplastic film 12, having a thermal expansion coefficient compatible with that of the metal foil being used. The molten resin 13 is cooled to form a bond between the sheet of metal foil 40 and the sheet of thermoplastic film 12, and a pattern of a heater element and an electrode line of an anti-corrosive material is continuously and repeatedly applied to the second surface of the sheet of metal foil. As in the earlier embodiments, it is within the scope of the invention to apply the repetitive pattern of anti-corrosive material to the sheet of metal foil before laminating the two layers of thermoplastic to the sheet of metal foil. After the two layers of thermoplastic and the anti-corrosive pattern have been applied to the sheet of metal foil 40, it is led at a constant line speed through the etching tank 30 wherein a caustic solution corrodes away those parts of the metal foil not treated with the anti-corrosive material. Next the excess caustic solution on the metal foil and the thermoplastic film are neutralized in tank 36 and the sheet is washed in tank 42 and dried by dryer 48.

At this point, that is, after the sheet 60 has been dried in dryer 48, the present embodiment of the invention diverges from the sequence of steps of the embodiments previously disclosed.

After the sheet 60 has been dried, a second thin layer of molten thermosensitive thermoplastic resin 76, of the same type as the molten resin 13, is applied by an extruder 75 to the second surface of the sheet of etched metal foil which is moving at a constant line speed. Approximately simultaneously another continuous sheet of metal foil 74 is supplied to the laminating station 70 from a roll of metal foil 73 at the constant line speed of the sheet of metal foil 60 and is placed with an exposed top surface over the thin layer of molten thermosensitive thermoplastic resin; as will be explained in detail below, the second sheet of metal foil 74 functions in the electric surface heaters as an electrode plate which is part of the circuitry that maintains the temperature or heat output of the electric surface heaters. This combination sheet 78 is then led between a rubber press roller 71 and a cooling roller 72; the rubber press roller 71 presses the combination sheet tightly against the cooling roller 72 to cause the layer of molten resin 76 to cool and form a flexible bond between the sheet of etched metal foil 60 and the second sheet of metal foil 74.

The combination sheet 78 is then led at a constant line speed by guide roller 77 to a third laminating station 54 where a layer of molten thermoplastic resin 53 is applied by an extruder 50 to the top surface of the second continuous sheet of metal foil 74; this third layer of molten thermoplastic resin 53 is not thermosensitive, but is rather a molten polyethylene or the like. Approximately simultaneously with the application of this third layer of molten thermoplastic resin 53 to the top surface of the second sheet of metal foil 73 of the combination sheet 78 a second continuous sheet of flexible insulating thermoplastic film 52, of the same type as the sheet of thermoplastic film 12, is supplied at the constant line speed of the combination sheet 78 to the laminating station 54 from a roll of thermoplastic film 51 and laminated over the third layer of molten thermoplastic resin 53. The sheet 55 is next passed between rubber press roller 57 and cooling 56; the rubber press roller 57 squeezes the sheet 55 tightly against the cooling roller 56 to cause the layer of molten thermoplastic resin 53 to cool and form a flexible bond between the second sheet of metal foil 74 and the second sheet of thermoplastic film 52.

Sheet 55 is directed by a guide roller 58 at a constant line speed to slicing rollers 59 which separate the continuous sheet between successive repetitive heater elements and electrode lines into a plurality of discrete thermosensitive surface heaters 80.

The heaters 80 may then be fed in a continuous line at a constant line speed to station 61 where electric terminals are applied in any well-known fashion to each heating element, electrode line and electrode plate. A safety device, which will be explained below, may also be connected to each heater at this time.

In an alternative method, rather than separating the continuous sheet 55 into individual heaters 80 in the single line process described, the sheet 55 can be rolled into a large roll for storage and separated into individual surface heaters at a later time.

Referring to FIGS. 5 and 6, there is illustrated a thermosensitive electric surface heater manufactured according to the present invention, specifically that embodiment of the invention discussed with reference to FIG. 2. A metal foil conductor or heater element 150 has a zig-zag pattern; the pattern is not per se a part of the invention and may have any suitable shape. Paralleling the heater element 150 at a constant distance are metal foil electrode lines 151. Both heater element 150 and electrode lines 151 are formed from the same strip of metal foil 40; this result is effected by the pattern of anti-corrosive material applied to metal foil 40. Completely surrounding and separating the heater element 150 and the electrode lines 151 are two layers of thermosensitive thermoplastic resin 152, which have a negative temperature-resistance coefficient, such as, for example, polyamide or polyvinyl formal; overlying the thermoplastic resin 152 is a metal foil electrode plate 154. On top of the electrode plate 154 is a layer of thermoplastic resin 155; this resin is different from the layers of thermosensitive thermoplastic resin 152 in that it is not thermosensitive. Covering the complete top and bottom surfaces of the electric surface heater are the sheets of flexible insulating thermoplastic film 156.

Electrically connected to the terminal ends of the heater element 150 are leads 170 and 173, which supply electrical power from a power source 160 through normally closed contacts 163 to the heater element 150 of the surface heater. The flow of electrical current through the resistive heater element 150 generates the heat output of the surface heater. The electrode plate 154 is connected to the surface heater's electric circuit through line 171 and a safety means which comprises a diode 162 and a relay coil 161 which controls the contacts 163. The electrode lines 151 are connected to the electrical circuit through lines 173 and 174; in a slight modification of the surface heater it is possible to interconnect the two electrode lines 151 by a proper choice of the pattern printed on the metal foil 40 and use only one connecting line to the single electrode line rather than two as shown in FIG. 6. As discussed relative to the surface heater illustrated in FIG. 4, the electrical resistance of the thermosensitive thermoplastic resin 152 decreases as its temperature increases and a leakage current flows through it. In the surface heater of FIG. 6 the leakage current flows from the electrode lines 151 through the resin 152 to the electrode plate 154. This current flow is sufficiently large at a predetermined temperature to cause the coil 161 to open the contacts 163 and thus remove electrical power from the heater element 150. When the temperature drops below the predetermined level, the leakage current decreases to the point where it is incapable of maintaining the contact 163 in an open position; the contact then returns to its normally closed position and power is once again applied to the heater element.

The advantage of this type of surface heater is that, since the electrode plate 154 is equally spaced from all points of the heater element 150 and the electrode lines 151, the surface heater detects a localized temperature rise in the heater element better than the surface heater of FIG. 4. When the temperature of a small area of the surface heater rises above a predetermined level, theresistance of the electrical resin at that localized area descreases and leakage current flows from the electrode lines to the electrode plate and through the safety means; the major portion of the leakage current does not flow from the heater element which has dissipated much of its power input.

It is readily apparent that various materials may be used and the sequence of oeprations may be slightly varied within the scope of this invention to obtain the desired surface heater. The invention will be further illustrated by the following working examples, although it is not intended to limit the invention to these particular examples:

EXAMPLE 1

A one meter wide strip of aluminum foil 20 $\mu$ thick was supplied to the production assembly at a continuous line speed of 30 m/min. A zig-zag pattern of an epoxy series anti-corrosive ink was printed on one surface of the aluminum foil by a printing roller which had a printing surface on which the zig-zag pattern had been engraved. After the printing operation, the foil was dried in an atomosphere of 200°C for one minute. Then, a layer of molten polyethylene 40 $\mu$ thick and, on top of the polyethylene, a polyester film 30 $\mu$ thick was laminated onto the second surface of the aluminum foil; the molten polythylene was set by passing the aluminum foil with the laminated polyethylene and polyester between a water-circulation cooling roller and a press roller. The foil was then passed through a solution of 15 percent caustic soda at a temperature of 50°C for a period of five minutes so that the caustic soda could etch away that part of the aluminum foil on which the eopxy series anti-corrosive ink was not printed. Next the etched foil was passed for one minute through a neutralizing agent of 0.5 percent solution of HCl. The foil was then washed for one minute in a tank of water and dried by infrared rays. A second layer of molten polyethylene 40 $\mu$ thick and, on top of the polyethylene, a polyester film 30 $\mu$ thick was then laminated onto the first uncovered surface of the aluminum foil. The molten polyethylene was set, as described above, by being passed between a press roller and a water-circulation cooling roller. The continuous strip of insulated, eteched foil was finally cut into individual heater elements and electric terminals were applied to the foil.

EXAMPLE 2

A strip of electrolytic copper foil 1 meter wide and 35 $\mu$ thick was supplied to the assembly at a rate of about 30 m/min. Polyethylene was applied to one surface of the foil in a molten state so as to form a thickness of 40 $\mu$ and a film of polyester 50 $\mu$ thick was laminated thereto. The molten polyethylene was caused to set by passing the foil with the molten polyethylene and the polyester film between a press roller and a water-circulation cooling roller. A zig-zag pattern was then applied on the oppoite surface of the foil using an epoxy series anti-corrosive ink. After this operation, the strip was passed through a drying atmoshpere of 120°C for five minutes and, then, through a 10 percent solution of ferric chloride at a temperature of 80°C for five minutes. The etched strip was then washed by passage through a water bath for five minutes and dried completely by exposure to infrared rays. Lamination of the insulative material was then accomplished on the exposed surface of the foil in the same manner as described above for the first surface of the copper foil.

EXAMPLE 3

A strip of aluminum foil 1 meter wide and 30 $\mu$ thick was supplied at a rate of about 30 m/min. By a photogravure printing process a zig-zag pattern of a heat generating line and a second pattern of an electrode line spaced from the heat generating line were printed on one surface of the foil using an epoxy series anti-corrosive ink. After the printing operation, the foil was dried in an atmosphere of 200°C for one minute. A molten ester copolymer 12 nylon (an ester copolymer 12 nylon with the product number L 1801 available from the German Company "Huls" has been found to perform quite well) was applied to the opposite surface of the aluminum foil such that the ester is 40 $\mu$ thick; on top of this ester was laid a strip of polyester film 50 $\mu$ thick and 1 meter wide. After the molten ester had been set, the laminated strip was passed through a 15 percent solution of caustic soda at a temperature of 50°C for five minutes to etch the aluminum foil. After the etching process, the strip was washed by being led through a water bath for five minutes and dried by exposure to infrared rays. Another layer of a molten ester copolymer 12 nylon 40 $\mu$ thick and a polyester film 50 $\mu$ thick and 1 meter wide was laminated to the first side of the aluminum foil in the same manner as above.

EXAMPLE 4

A strip of aluminum foil 50 $\mu$ thick and 2 meters wide was supplied at the approximate rate of 30 m/min. By a photogravure printing process a zig-zag pattern of a heat generating line and a second pattern of an electrode line spaced from the heat generating line were printed on one surface of the foil using an epoxy series anti-corrosive ink. The foil thus printing-processed was dried in an atmosphere of 200°C for one minute. A molten ester copolymer 12 nylon was applied to the opposite surface of the aluminum foil such that the ester is 40 $\mu$ thick; on top of this ester was laid a strip of polyester film 50 $\mu$ thick and 1 meter wide. After the molten ester had been set, the laminated strip was passed through a 15 percent solution of caustic soda at a temperature of 50°C for five minutes to etch the aluminum foil. After the etching process, the strip was washed by being led through a water bath for five minutes and dried by exposure to infrared rays. A second layer of molten ester copolymer 12 nylon 40 $\mu$ thick was applied to the first surface of the etched aluminum foil. A second strip of aluminum foil 50 $\mu$ thick and 1.8 meters wide, which is to function as an electrode plate, was laid on the upper surface of the molten ester so as to adhere thereto. Then molten polyethylene was applied to the top surface of the second aluminum strip. A last strip of polyester film 50 $\mu$ thick and 2 meters wide was laminated over the molten polyethylene. This method produced a flexible, electric surface heater that was thermosensitive.

EXAMPLE 5

A strip of aluminum foil 20 $\mu$ thick and 1 meter wide was supplied at the approximate rate of 30 m/min. A zig-zag pattern of a heat generating line was printed by, for example, a photogravure printing method or a sequential screen printing method with an epoxy series anti-corrosive ink on a first surface of the foil. After the printing operation, the foil was dried in an atmosphere of 200°C for one minute and, then, a molten polyethylene 40 $\mu$ thick was applied to the non-printed surface of the aluminum foil; on top of the molten polyethylene was laid a polyester film 30 $\mu$ thick and 1 meter wide. The molten polyethylene was caused to set by passing the aluminum foil with the layers of polyethylene and polyester film between a press roller and a water-circulation cooling roller. A second layer of molten polyethylene 40 $\mu$ thick was applied on top of the polyester film and was set by passing the combination through a second set of a press roller and a water-circulation cooling roller. Next the printed aluminum foil with its laminated layers of polyethylene and polyester film was passed through a 15 percent solution of caustic soda at 50°C for five minutes to etch the aluminum foil. The strip was neutralized by passing it through a 0.5 percent solution of HCl for five minutes. Thereafter, the strip was washed for five minutes in a water bath and dried by exposure to infrared rays. After the drying operation, molten polyethylene 40 $\mu$ thick was applied to the first surface of the etched aluminum foil; on top of the molten polyethylene was laid a polyester film 30 $\mu$ thick and 1 meter wide. The molten polyethylene was set using a cooling roller and another layer of molten polyethylene 40 $\mu$ thick, which was also set by use of a cooling roller as described above, was applied over the polyester film. As in the other examples, the strip was cut into individual heaters and electric terminals were added to the aluminum foil.

From the above description of a few embodiments of the invention it is clear that we have invented a simple and efficient method, which includes a minimum of steps, of continuously manufacturing in an automated single line process flexible electrical surface heaters of a variety of designs, including thermosensitive surface heaters, having highly uniform structures. Although the invention has been described in connection with various preferred embodiments, it will be understood that the invention is not limited to any particular form or the forms illustrated, but on the contrary, is intended to cover the various modifications and alternatives included within the spirit and scope of the invention as claimed.

We claim as our invention:

1. A method of continuously manufacturing flexible electric surface heaters comprising the steps of supplying a sheet of electrically conductive metal foil and a sheet of flexible insulating thermoplastic film at a constant line speed and a first constant flow of molten thermoplastic resin, applying said first constant flow of molten thermoplastic resin to a first side of said sheet of metal foil to form a first layer of molten thermoplastic resin, laminating said first sheet of insulating thermoplastic film over said first layer of molten thermoplastic resin, cooling said first layer of molten thermoplastic resin to form a flexible bond between said first side of said sheet of metal foil and said first sheet of insulating thermoplastic film, applying a repetitive heater element pattern of anti-corrosive material to the second side of said sheet of metal foil, removing in an etching process the unpatterned portions of said sheet of metal foil to form a sheet of repetitive metal foil heater elements, applying a second constant flow of molten thermoplastic resin to said second side of said sheet of repetitive metal foil heater elements to form a second layer of molten thermoplastic resin, laminating a second sheet of flexible insulating thermoplastic film over said second layer of molten thermoplastic resin, and cooling said second layer of molten thermoplastic resin to form a flexible bond between said second side of said sheet of metal foil heater elements and said second sheet of insulating thermoplastic film, whereby there is manufactured a plurality of electric surface heaters in an insulated sheet of repetitive metal foil heater elements enclosed in an insulating thermoplastic film which is bonded to said repetitive metal foil heater elements by a flexible thermoplastic resin which completely covers said repetitive metal foil heater elements.

2. The method of claim 1 wherein said steps of applying said first constant flow of molten thermoplastic resin to said first side of said sheet of metal foil and of laminating said first sheet of insulating thermoplastic film over said first layer of molten thermoplastic resin are performed approximately simultaneously, and said steps of applying said second constant flow of molten thermoplastic resin to said sheet of repetitive metal foil heater elements and of laminating said second sheet of insulating thermoplastic film over said second layer of molten thermoplastic resin are performed approximately simultaneously.

3. The method of claim 1 further comprising separating said insulated sheet of repetitive metal foil heater elements between successive ones of said repetitive metal foil heater elements into individual electric surface heaters.

4. The method of claim 3 further comprising connecting electrical contact terminals to the heater element of each of said individual electric surface heaters.

5. A method of continuously manufacturing flexible electric surface heaters in a single line process comprising the steps of supplying a sheet of electrically conductive metal foil having a repetitive heater element pattern of anti-corrosive material on a first side and a sheet of flexible insulating thermoplastic fi'm at a constant line speed and a first constant flow of molten thermoplastic resin, applying said first constant flow of molten thermoplastic resin to the second side of said sheet of metal foil to form a first layer of molten thermoplastic resin, laminating said first sheet of insulating thermoplastic film over said first layer of molten thermoplastic resin, cooling said first layer of molten thermoplastic resin to form a flexible bond between said second side of said sheet of metal foil and said first sheet of insulating thermoplastic film, etching the unpatterned portions of said sheet of metal foil to form a sheet of repetitive metal foil heater elements, applying a second constant flow of molten thermoplastic resin to said first side of said sheet of repetitive metal foil heater elements to form a second layer of molten thermoplastic resin, laminating a second sheet of flexible insulating thermoplastic film over said second layer of molten thermoplastic resin, and cooling said second layer of molten thermoplastic resin to form a flexible bond between said first side of said sheet of metal foil heater elements and said second sheet of insulating thermoplastic film, whereby there is manufactured a plurality of electric surface heaters in an insulated sheet of repetitive metal foil heater elements enclosed in an insulating thermoplastic film which is bonded to said repetitive metal foil heater elements by a flexible thermoplastic resin which completely covers said repetitive metal foil heater elements.

6. The method of claim 5 wherein said steps of applying said first constnat flow of molten thermoplastic resin to said first side of said sheet of metal foil and of laminating said first sheet of insulating thermoplastic film over said first layer of molten thermoplastic resin are performed approximately simultaneously, and said steps of applying said second constant flow of molten thermoplastic resin to said sheet of repetitive metal foil heater elements and of laminating said second sheet of insulating thermo-plastic film over said second layer of molten thermoplastic resin are performed approximately simultaneously.

7. The method of claim 5 further comprising separating said insulated sheet of repetitive metal foil heater elements between successive ones of said repetitive metal foil heater elements into individual electric surface heaters.

8. The method of claim 7 further comprising connecting elctrical contact terminals to the heater element of each of said individual electric surface heaters.

9. A method of continuously manufacturing flexible thermosensitive electric surface heaters in a single line process comprising the steps of supplying a sheet of electrically conductive metal foil and a sheet of flexible insulating thermoplastic film at a constant line speed and a first constnat flow of molten thermosensitive thermoplastic resin, applying said first constant flow of molten thermosensitive thermoplastic resin to a first side of said sheet of metal foil to form a first layer of said molten thermosensitive thermoplastic resin, laminating said first sheet of insulating thermoplastic film over said first layer of molten thermosensitive thermoplastic resin, cooling said first layer of molten thermosensitive thermoplastic resin to form a flexible bond between said first side of said sheet of metal foil and said first sheet of insulating thermoplastic film, applying a repetitive heater element and electrode line pattern of anti-corrosive material to the second side of said sheet of metal foil, removing in an etching process the unpatterned portions of said sheet of metal foil to form a sheet of repetitive metal foil heater elements and electrode lines, applying a second constant flow of molten thermosensitive thermoplastic resin to said second side of said sheet of repetitive metal foil heater elements and electrode lines to form a second layer of molten thermosensitive thermoplastic resin, laminating a second sheet of flexible insulating thermoplastic film over said second layer of molten thermosensitive thermoplastic resin, and cooling said second layer of molten thermosensitive thermoplastic resin to form a flexible bond between said second side of said sheet of metal foil heater elements and electrode lines and said second sheet of insulating thermoplastic film, whereby there is manufactured in a single line process a plurality of electric surface heaters in an insulated sheet of repetitive metal foil heater elements and electrode lines enclosed in an insulating thermoplastic film which is bonded to said repetitive metal foil heater elements and electrode lines by a flexible thermosensitive thermoplastic resin which completely covers said repetitive metal foil heater elements and electrode lines and acts as a variable thermosensitive electrical resistance path between said metal foil heater elements and said metal foil electrode lines.

10. The method of claim 9 further comprising separating said insulated sheet of repetitive metal foil heater elements and electrode lines between successive ones of said repetitive metal foil heater elements and electrode lines into individual electric surface heaters, each having a metal foil heater element and a metal foil electrode line, and connecting electrical contact terminals and a safety means to said heater element and said electrode line of each of said individual electric surface heaters.

11. A method of continuously manufacturing flexible thermosensitive electric surface heaters in a single line process comprising the steps of supplying a sheet of electrically conductive metal foil and a sheet of flexible insulating thermoplastic film at a constant line speed and a first constant flow of molten thermosensitive thermoplastic resin, applying said first constant flow of molten thermosensitive thermoplastic resin to a first side of said sheet of metal foil to form a first layer of said molten thermosensitive thermoplastic resin, laminating said first sheet of insulating thermoplastic film over said first layer of molten thermosensitive thermoplastic resin, cooling said first layer of molten thermosensitive thermoplastic resin to form a flexible bond between said first side of said sheet of metal foil and said first sheet of insulating thermoplastic film, applying a repetitive heater element and electrode line pattern of anti-corrosive material to the second side of said sheet of metal foil, removing in an etching process the unpatterned portions of said sheet of metal foil to form a sheet of repetitive metal foil heater elements and electrode lines, applying a second constant flow of molten thermosensitive thermoplastic resin to said second side of said sheet of repetitive metal foil heater elements and electrode lines to form a second layer of molten thermosensitive thermoplastic resin, applying a sheet of metal foil electrode plate over said second layer of molten thermosensitive thermoplastic resin, cooling said second layer of molten thermosensitive thermoplastic resin to form a flexible bond between said second side of said sheet of metal foil heater elements and electrode lines and a first side of said sheet of metal foil electrode plate, applying a constant flow of molten thermoplastic resin to a second side of said sheet of metal foil electrode plate to form a layer of molten thermoplastic resin, laminating a second sheet of flexible insulating thermoplastic film over said layer of molten thermoplastic resin, and cooling said layer of molten thermoplastic resin to form a flexible bond between said second side of said second sheet of metal foil and said second sheet of insulating thermoplastic film, whereby there is manufactured in a single line process a plurality of thermosensitive electric surface heaters in an insulated sheet of repetitive metal foil heater elements, electrode lines and electrode plates.

12. The method of claim 11 further comprising separating said insulated sheet between successive ones of said plurality of thermosensitive electric surface heaters into individual electric surface heaters, each having a metal foil heater element, a metal foil electrode line and a metal foil electrode plate, and connecting electrical contact terminals and a safety means to said heater element, said electrode line and said electrode plate of each of said individual electric surface heaters.

13. A method of continuously manufacturing flexible thermosensitive electric surface heaters in a single line process comprising the steps of supplying a sheet of electrically conductive metal foil having a repetitive heater element and electrode line pattern of anti-corrosive material on a first side, and a sheet of flexible insulating thermoplastic film at a constant line speed and a first constant flow of molten thermosensitive thermoplastic resin, applying said first constant flow of molten thermosensitive thermoplastic resin to the second side of said sheet of metal foil to form a first layer of said molten thermosensitive thermoplastic resin, laminating said first sheet of insulating thermoplastic film over said first layer of molten thermosensitive thermoplastic resin, cooling said first layer of molten thermosensitive thermoplastic resin to form a flexible bond between said second side of said sheet of metal foil and said first sheet of insulating thermoplastic film, removing in an etching process the unpatterned portions of said sheet of metal foil to form a sheet of repetitive metal foil heater elements and electrode lines, applying a second constant flow of molten thermosensitive thermoplastic resin to said first side of said sheet of repetitive metal foil heater elements and electrode lines to form a second layer of molten thermosensitive thermoplastic resin, laminating a second sheet of flexible insulating thermoplastic film over said second layer of molten thermosensitive thermoplastic resin, and cooling said second layer of molten thermosensitive thermoplastic resin to form a flexible bond between said first side of said sheet of metal foil heater elements and electrode lines and said second sheet of insulating thermoplastic film, whereby there is manufactured in a single line process a plurality of electric surface heaters in an insulated sheet of repetitive metal foil heater elements and electrode lines enclosed in an insulating thermoplastic film which is bonded to said repetitive metal foil heater elements and electrode lines by a flexible thermosensitive thermoplastic resin which completely covers said repetitive metal foil heater elements and electrode lines and acts as a variable thermosensitive electrical resistance path between said metal foil heater elements and said metal foil electrode lines.

14. The method of claim 13 further comprising separating said insulated sheet of repetitive metal foil heater elements and electrode lines between successive ones of said repetitive metal foil heater elements and electrode lines into individual electric surface heaters, each having a metal foil heater element and a metal foil electrode line, and connecting electrical contact terminals and a safety means to said heater element and said electrode line of each of said individual electric surface heaters.

15. A method of continuously manufacturing flexible thermosensitive electric surface heaters in a single line process comprising the steps of supplying a sheet of electrically conductive metal foil having a repetitive heater element and electrode line pattern of anti-corrosive material on a first side and a sheet of flexible insulating thermoplastic film at a constant line speed and a first constant flow of molten thermosensitive thermoplastic resin, applying said first constant flow of molten thermosensitive thermoplastic resin to the second side of said sheet of metal foil to form a first layer of said molten thermosensitive thermoplastic resin, laminating said first sheet of insulating thermoplastic film over said first layer of molten thermosensitive thermoplastic resin, cooling said first layer of molten thermosensitive thermoplastic resin to form a flexible bond between said second side of said sheet of metal foil and said first sheet of insulating thermoplastic film, removing in an etching process the unpatterned portions of said sheet of metal foil to form a sheet of repetitive metal foil heater elements and electrode lines, applying a second constant flow of molten thermosensitive thermoplastic resin to said first side of said sheet of repetitive metal foil heater elements and electrode lines to form a second layer of molten thermosensitive thermoplastic resin, applying a sheet of metal foil electrode plate over said second layer of molten thermosensitive thermoplastic resin, cooling said second layer of molten thermosensitive thermoplastic resin to form a flexible bond between said first side of said sheet of metal foil heater elements and electrode lines and a first side of said sheet of metal foil electrode plate, applying a constant flow of molten thermoplastic resin to a second side of said sheet of metal foil electrode plate to form a layer of molten thermoplastic resin, laminating a second sheet of flexible insulating thermo-plastic film over said layer of molten thermoplastic resin, and cooling said layer of molten thermoplastic resin to form a flexible bond between said second side of said second sheet of metal foil and said second sheet of insulating thermoplastic film, whereby there is manufactured in a single line process a plurality of thermosensitive electric surface heaters in an insulated sheet of repetitive metal foil heater elements, electrode lines and electrode plates.

16. The method of claim 15 further comprising separating said insulated sheet between successive ones of said plurality of thermosensitive electric surface heaters into individual electric surface heaters, each having a metal foil heater element, a metal foil electrode line and a metal foil electrode plate, and connecting electrical contact terminals and a safety means to said heater element, said electrode line and said electrode plate of each of said individual electric surface heaters.

17. A method of continuously manufacturing flexible electric surface heaters in a single line process comprising the steps of providing a continuous sheet of electrically conductive metal foil, applying a first constant flow of molten thermoplastic insulating resin to a first side of said sheet of metal foil to form a first layer of molten thermoplastic resin, cooling said first layer of molten thermoplastic resin, applying a repetitive heater element pattern of anti-corrosive material to the second side of said sheet of metal foil, removing in an etching process the unpatterned portions of said sheet of metal foil to form a sheet of repetitive metal foil heater elements, applying a second constant flow of molten thermoplastic insulating resin to said sheet of repetitive metal foil heater elements to form a second layer of molten thermoplastic resin, and cooling said second layer of molten thermoplastic resin.

18. A method of manufacturing flexible electric surface heaters comprising the steps of providing a continuous sheet of electrically conductive metal foil, providing a first continuous sheet of flexible insulating thermoplastic film, continuously supplying a first constant flow of molten thermoplastic resin between said sheet of electrically conductive metal foil and said sheet of flexible insulating thermoplastic film to form a first layer of molten thermoplastic resin, cooling said first layer of molten thermoplastic resin to form a flexible bond between said sheet of metal foil and said first sheet of insulating thermoplastic film, printing a heater element pattern of anti-corrosive material on a surface of said sheet of electrically conductive metal foil, removing in an etching process the unpatterned portions of said sheet of metal foil to form a sheet of metal foil heater elements, providing a second continuous sheet of flexible insulating thermoplastic film, continuously supplying a second constant flow of molten thermoplastic resin between said sheet of metal foil heater elements and said second continuous sheet of flexible insulating thermoplastic film to form a second layer of molten thermoplastic resin, and cooling said second layer of molten thermoplastic resin to form a flexible bond between said sheet of metal foil heater elements and said second sheet of insulating thermoplastic film, whereby there is manufactured a plurality of metal foil heater elements enclosed in insulating thermoplastic films bonded to said metal foil heater elements by a flexible thermoplastic resin which completely covers said metal foil heater elements.

* * * * *